(12) United States Patent
Kim et al.

(10) Patent No.: US 9,721,198 B2
(45) Date of Patent: Aug. 1, 2017

(54) IMAGE-FORMING APPARATUS HAVING EXTERNAL SECURITY PAPER DETECTION UNIT AND IMAGE-FORMING METHOD THEREOF

(71) Applicant: ELECTRONICS AND TELECOMMUNICATIONS RESEARCH INSTITUTE, Daejeon (KR)

(72) Inventors: Min Sik Kim, Daejeon (KR); Seung Jin Ryu, Daejeon (KR); Han Jun Yoon, Daejeon (KR); Do Hoon Lee, Daejeon (KR); Nak Jun Jeong, Seoul (KR); Min Ho Noh, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/138,616

(22) Filed: Apr. 26, 2016

(65) Prior Publication Data

US 2016/0321526 A1    Nov. 3, 2016

(30) Foreign Application Priority Data

Apr. 28, 2015  (KR) .......................... 10-2015-0059722

(51) Int. Cl.
*G06K 15/02* (2006.01)
*G06K 15/16* (2006.01)
(Continued)

(52) U.S. Cl.
CPC ..... *G06K 15/4065* (2013.01); *G06K 15/4095* (2013.01); *H04N 1/0001* (2013.01);
(Continued)

(58) Field of Classification Search
None
See application file for complete search history.

(56) References Cited

U.S. PATENT DOCUMENTS 5,946,889 A * 9/1999 Baker .................. H04N 1/4446
156/441.5
6,118,367 A * 9/2000 Ishii ......................... H01Q 7/00
340/10.1
(Continued)

FOREIGN PATENT DOCUMENTS

JP        2014-047048    *  3/2014  ............... B65H 3/00
KR    10-2009-0120300 A    11/2009
(Continued)

*Primary Examiner* — Beniyam Menberu
(74) *Attorney, Agent, or Firm* — LRK Patent Law Firm

(57) ABSTRACT

An external security paper detection unit, an image-forming apparatus having the external security paper detection unit, and an image-forming method related to the apparatus. The external security paper detection unit includes a paper stack unit in which sheets of paper are stacked in order to feed the paper, a paper feed unit for feeding the paper stacked in the paper snick unit, a security paper detection unit for detecting whether moving paper is security paper or not, and a unit controller for normally supplying the moving security paper to a manual feed tray if the paper feed unit operates and a security paper detection signal is input from the security paper detection unit, whereby an image is formed only on the security paper, thus preventing the illegal leakage of documents.

13 Claims, 5 Drawing Sheets

(51) Int. Cl.
*G06F 3/12* (2006.01)
*H04N 1/00* (2006.01)
*G06K 15/00* (2006.01)

(52) U.S. Cl.
CPC ..... *H04N 1/00037* (2013.01); *H04N 1/00058* (2013.01); *H04N 1/00076* (2013.01); *H04N 1/00092* (2013.01); *G06K 15/16* (2013.01)

(56) References Cited

U.S. PATENT DOCUMENTS

| | | | |
|---|---|---|---|
| 7,885,597 B2* | 2/2011 | Gast | H04N 1/00567 271/162 |
| 2004/0251589 A1* | 12/2004 | Satoh | B65H 5/062 271/10.01 |
| 2005/0168766 A1* | 8/2005 | Troyansky | G06F 21/608 358/1.14 |
| 2005/0231769 A1* | 10/2005 | Gast | H04N 1/00567 358/496 |
| 2006/0038693 A1* | 2/2006 | Miyake | B41J 29/393 340/652 |
| 2007/0194098 A1* | 8/2007 | Nakata | B41J 3/44 235/375 |
| 2007/0253022 A1* | 11/2007 | Oshima | B41J 3/50 358/1.15 |
| 2007/0253419 A1* | 11/2007 | Oshima | B41J 3/44 370/392 |
| 2008/0030796 A1* | 2/2008 | Sakamoto | G06K 1/18 358/444 |
| 2008/0204802 A1* | 8/2008 | Tanimoto | H04N 1/00127 358/1.15 |
| 2008/0239379 A1* | 10/2008 | Ito | H04N 1/00209 358/1.15 |
| 2008/0297822 A1* | 12/2008 | Miyahara | G03G 21/02 358/1.13 |
| 2009/0130981 A1* | 5/2009 | Nagai | H04B 1/126 455/63.1 |
| 2012/0249131 A1* | 10/2012 | Yamaguchi | H04N 1/00806 324/244 |

FOREIGN PATENT DOCUMENTS

| | | |
|---|---|---|
| KR | 10-2011-0115460 A | 10/2011 |
| KR | 10-2011-0138207 A | 12/2011 |
| KR | 10-2012-0006185 A | 1/2012 |
| KR | 10-2013-0020019 A | 2/2013 |

* cited by examiner

IMAGE-FORMING APPARATUS HAVING EXTERNAL SECURITY PAPER DETECTION UNIT AND IMAGE-FORMING METHOD THEREOF

CROSS REFERENCE TO ELATED APPLICATION

This application claims the benefit of Korean Patent Application No. 10-2015-0059722, filed Apr. 28, 2015 which is hereby incorporated by reference in its entirety into this application.

BACKGROUND OF THE INVENTION

1. Technical Field

The present invention generally to an image-forming apparatus having an external security paper detection unit and a related image-forming method. More particularly, the present invention relates to an image-forming apparatus having an external security paper detection unit and an image-forming method related to the apparatus, in which an external security paper detection unit is arranged in order to detect security paper outside the apparatus and to supply the security paper to a manual feed tray.

2. Description of the Related Art

Generally, companies invest a lot of time and money in technology in order to develop new products. Also, many companies spend a lot of time and money on security in order to stay ahead of their competitors.

Technology leaks are committed by moving data outside companies using storage media or printed documents. Accordingly, security technology for forbidding storage media from being carried out has been developed. However, it is difficult to prevent the leakage of documents due to problems such as invasion of privacy and the like.

In order to solve the above-mentioned problem, technology in which sensitive documents may be prevented from being leaked in such a way that a tag made of metallic material is attached to printing paper, sensitive documents are printed on the security paper to which the detectable tag is attached, and a tag reader detects the printed paper when it passes through a predetermined gate is being developed.

However, it is not cost effective to buy a new image-forming apparatus in order to use security paper. Also, there is a problem in which sensitive documents may be printed or copied not on security paper but on common paper simply by loading the common paper into a security paper cassette.

SUMMARY OF THE INVENTION

Accordingly, the present invention has been made keeping in mind the above problems, and an object of the present invention is to provide an image-forming apparatus having an external security detection unit and an image-forming method related to the apparatus in which an external security paper detection unit is arranged in order to detect security paper outside the apparatus and to supply the security paper to a manual feed tray.

In order to accomplish the above object, an external security paper detection unit according to an embodiment of the present invention provides a paper stack unit in which sheets of paper are stacked; a paper feed unit for feeding the paper stacked in the paper stack unit; a security paper detection unit for detecting whether moving paper is security paper; and a unit controller for normally supplying the moving security paper to a manual feed tray if the paper feed unit operates and a security paper detection signal is input from the security paper detection unit.

The external security paper detection unit may thither include a paper movement detection unit for detecting whether paper is being fed, and the unit controller may control the security paper detection unit so as to be activated if a paper detection signal is input from the paper movement detection unit.

The external security paper detection unit may further include a paper movement division unit for supplying security paper to the manual feed tray if the moving paper is security paper and for ejecting the moving paper if the moving paper is not security paper. Also, the unit controller may be configured to control the paper movement division unit so as to supply the moving paper to the manual feed tray if a security paper detection signal is input from the security paper detection unit, and to generate a warning alarm and simultaneously control the paper movement division unit so as to eject the moving paper if a paper feeding completion signal is input from the paper movement detection unit but the security paper detection signal is not input from the security paper detection unit.

The external security paper detection unit may further include a device interface unit that is capable of communicating with a main body of an image-forming apparatus, and the unit controller may supply the moving paper to the manual feed tray regardless of whether a security paper detection signal is input from the security paper detection unit, and may control the device interface unit so as to transmit a security paper error signal to the main body of the image-forming apparatus if a paper feeding completion signal is input from the paper movement detection unit but the security paper detections signal is not input from the security paper detection unit.

The external security paper detection unit may further include a manual feed tray paper detection unit for detecting whether security paper is present in the manual feed tray, and the unit controller may control the paper feed unit so as to feed the paper stacked in the paper stack unit if a paper absence signal is input from the manual feed tray paper detection unit.

The security paper may be paper in which an RF tag is inserted, and the security paper detection unit may be an RF tag paper detection unit that is capable of detecting the RF tag inserted in the security paper.

The RF tag paper detection unit may include a transmission part for supplying power to the RF tag through an RF transmission antenna; a reception part for receiving a tag signal from the RF tag through an RF reception antenna; a signal shaping part for converting the tag signal received by the reception part into a digital signal; and a control part for determining whether moving paper is RF tag paper based on the digital signal input from the signal shaping part.

The reception part may receive the tag signal from the RF tag not only through the RF reception antenna but also through the RF transmission antenna.

The transmission part may include multiple switching, functions that are capable of adjusting an intensity of output power of the RF transmission antenna, and the control part may control the multiple switching functions of the transmission part based on a level of the tag signal from the RF tag, which is received by the reception unit.

An image-forming apparatus according to another embodiment of the present invention may achieve the above object by providing the above-described external security paper detection unit and a main body that stops taking in paper loaded in the manual feed tray if an error signal related to security paper is input from the external security paper detection unit.

An image-forming method according to a further embodiment of the present invention may achieve the above object by providing feeding paper from a paper stack unit; detecting whether moving paper is security paper; and normally supplying the moving security paper to a manual feed tray if a security paper detection signal is input as a result of the detecting.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of an image-forming apparatus having an external security paper detection unit and an image-forming method related to the apparatus will be described with reference to the accompanying drawings. Prior to the following detailed description of the present invention, terms that indicate elements of the present invention are described in consideration of the function of each of the elements, but the elements should not be construed as being limited by the terms.

Figure 1:
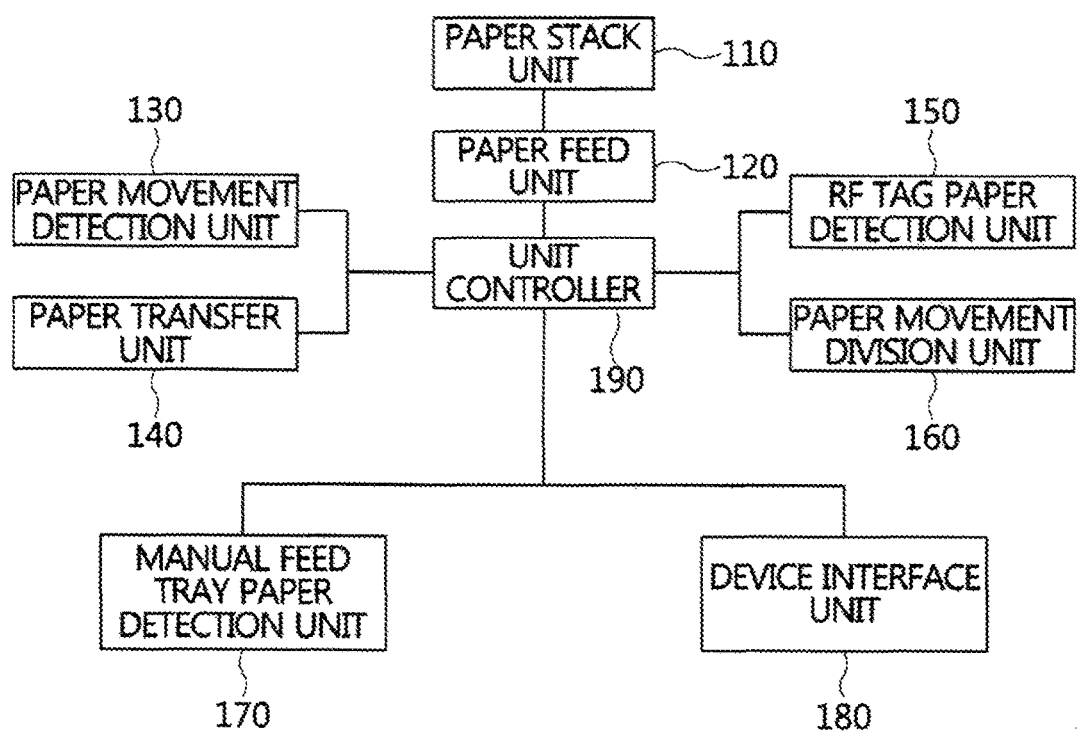
FIG. 1 is a block diagram of an external security paper detection unit according to an embodiment of the present invention.

FIG. 1 is a block diagram of an external security paper detection unit according to an embodiment of the present invention.

As illustrated in FIG. 1, the external security paper detection unit includes a paper stack unit 110, a paper feed unit 120, a paper movement detection unit 130, a paper transfer unit 140, an RF tag paper detection unit 150, a paper movement division unit 160, a manual feed tray paper detection unit 170, a device interface unit 180, and a unit controller 190.

The paper stack unit 110 is a paper input tray or a paper input slot from which security paper in which an RF tag is inserted is fed. However, because a user may load sheets of common paper in the paper stack unit 110 for copying or printing, the present invention includes the process of detecting whether paper fed from the paper stack unit 110 is security paper, in which an RF tag is inserted, or common paper.

The paper feed unit 120 includes a paper feeding roller, and supplies security paper, fed from the paper stack unit 110, to the RF tag paper detection unit 150. When the paper feed unit 120 is operated by the unit controller 190, the paper movement detection unit 130 detects whether paper is being, fed and whether feeding of paper is completed. To this end, the paper movement detection unit 130 may comprise a light emission unit (not illustrated) for emitting light and a light reception unit (not illustrated) for receiving the light emitted from the light emission unit.

The paper transfer unit 140 includes a transfer roller, and may transfer paper fed by the paper feed unit 120 to a manual feed tray. The RF tag paper detection unit 150 serves to detect whether the moving paper is RF tag paper or common paper. Here, it is desirable for RF transmission and/or reception antennas of the RF tag paper detection unit 150 to be arranged to cover the entire width of the paper so as to enable an RF tag inserted in the security paper to be supplied with power and to be detected regardless of the location of the RF tag in the security paper.

If the moving paper is RF tag paper, the paper movement division unit 160 may supply it to the manual feed tray. If the moving paper is common paper, the paper movement division unit 160 ejects the paper. The manual feed tray paper detection unit 170 serves to detect whether the RF tag paper, supplied from the paper movement division unit 160 to the manual feed tray, has been temporarily removed.

If the main body of the image-forming apparatus takes in the security paper from the manual feed tray and there is no security paper in the manual feed tray, a security paper absence signal is provided from the manual feed tray paper detection unit 170 to the unit controller 190. If there is no security paper in the manual feed tray, the unit controller 190 controls the paper feed unit 120 so as to supply RF tag paper to the manual feed tray.

Then, if a paper feeding detection signal is input from the paper movement detection unit 130, the unit controller 190 controls the RF tag paper detection unit 150 in order to supply power from the RF transmission antenna of the RF tag paper detection unit 150 to the RF tag of the security paper, and then checks whether an RF tag detection signal is input from the RF tag paper detection unit 150. If the RF tag detection signal is input from the RF tag paper detection unit 150, the unit controller determines that security paper is inserted and then controls the paper movement division unit 160 so as to supply the paper to the manual feed tray.

However, if a paper feeding completion signal is input from the paper movement detection unit 130 but an RF tag detection signal is not input from the RF tag paper detection unit 150, the unit controller 190 generates a warning alarm and simultaneously controls the paper movement division unit 160 so as to elect the moving paper in order to prevent common paper from being supplied to the manual feed tray.

Meanwhile, if a user removes RF tag paper front the manual feed tray in order to supply common paper thereto, the manual feed tray paper detection unit 170 detects this and provides a paper removal signal to the unit controller 190. The unit controller 190 transmits a security paper-related error signal to the main body of the image-forming apparatus through the device interface unit 180, whereby the main body of the image-forming apparatus may be prevented from operating.

FIG. 1 shows the configuration in which the paper transfer unit and the paper movement division unit 160 are included for clarity of description, but these components are not essential. In the configuration in which the paper movement division unit 160 is not included, if a paper feeding completion signal is input from the paper movement detection unit 130 but an RF tag detection signal is not input from the RF tag paper detection unit 150, the unit controller 190 transmits an error signal to the main body of the image-forming apparatus through the device interface unit 180. Accordingly, even if common paper is supplied to the manual feed tray, the image-forming apparatus does not take in the common paper, supplied to the manual feed tray, whereby the item to be secured is prevented from being printed or copied on the common paper.

Figure 2:
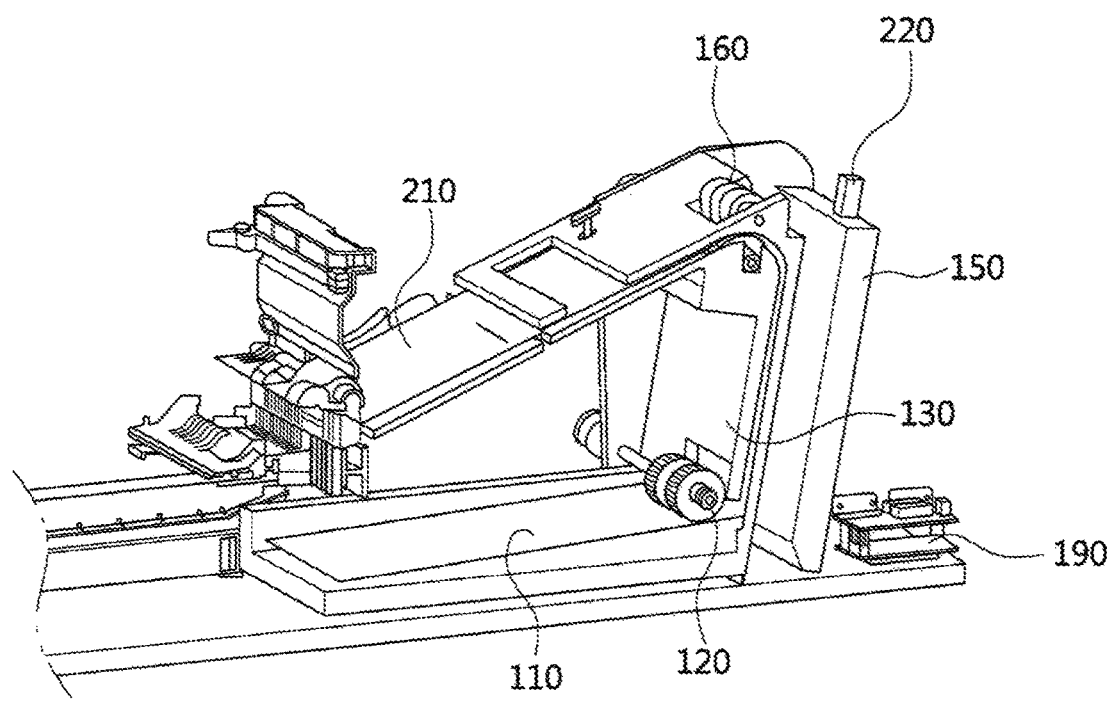
FIG. 2 is a view illustrating an example of an external security paper detection unit according to an embodiment of the present invention.

FIG. 2 is a view illustrating an example of an external security paper detection unit according to an embodiment of the present invention.

The paper stack unit 110 is a paper input tray or a paper input slot from which security paper, in which an RF tag is inserted, is fed. However, a user may load sheets of common paper in the paper stack unit 110 for copying or printing. The paper feed unit 120 includes a paper feeding roller, and supplies security paper, fed from the paper stack unit 110, to the RF tag paper detection unit 150.

When the paper feed unit 120 is operated by the unit controller 190, the paper movement detection unit 130 detects whether paper is wing fed and whether feeding of paper is completed. The RF tag paper detection unit 150 serves to detect whether the moving paper is RF tag paper or common paper, and may communicate with the unit controller 190 through an RF tag paper recognition interface 220. If the moving paper is RF tag paper, the paper movement division unit 160 supplies it to the manual feed tray 210. If the moving paper is common paper, the paper movement division unit 160 may eject the paper.

Figure 3:
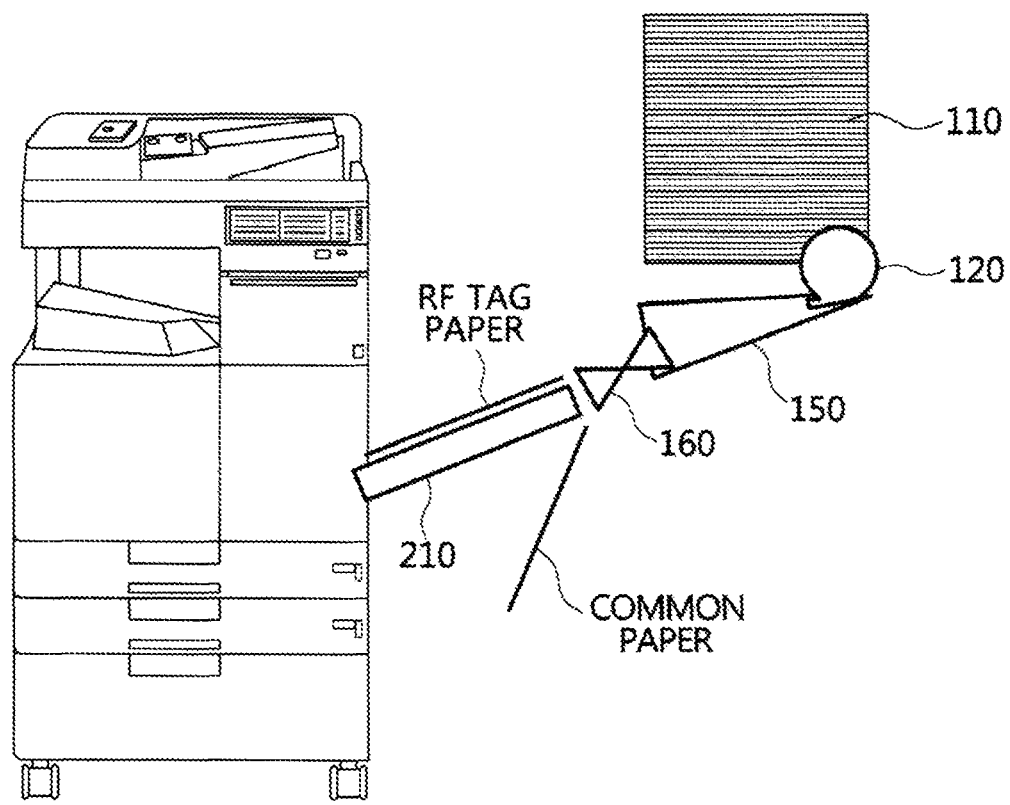
FIG. 3 is a view illustrating another example of an external security paper detection unit according to an embodiment of the present invention.

FIG. 3 illustrates another example of an external security paper detection unit according to an embodiment of the present invention.

The paper stark unit 110 is a paper input tray or a paper input slot from which security paper, in which an RF tag is inserted, is fed. However, a user may load sheets of common paper in the paper stack unit 110 for copying or printing. The paper feed unit 120 includes a paper feeding roller, and supplies security paper, fed from the paper stack unit 110, to the RF tag paper detection unit 150.

The RF tag paper detection unit 150 detects whether the moving paper is RF tag paper or common paper. The paper movement division unit 160 maintains the state in which paper is ejected if RF tag paper is not detected by the RF tag paper detection unit 150. Only when RF tag paper is detected by the RF tag paper detection unit 150 is the paper movement division unit 160 connected to the manual feed tray 210 in order to supply the security paper thereto.

Referring to FIG. 3, it may be understood that the present invention may supply security paper to the manual feed tray 210 even if the paper movement detection unit 130 is not included.

Figure 4:
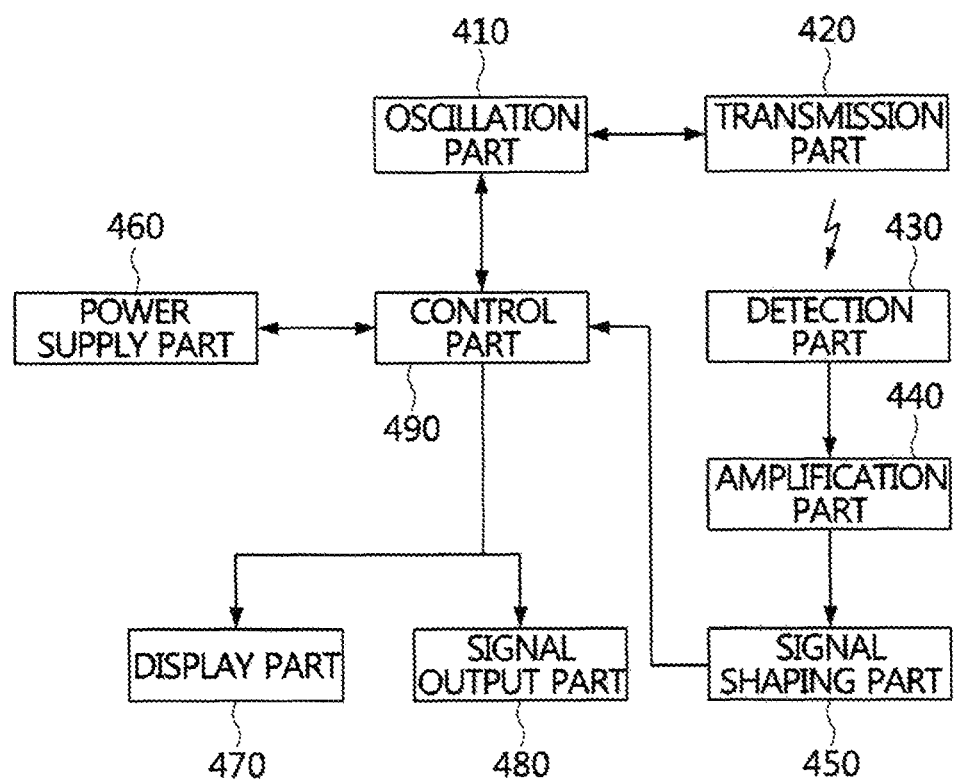
FIG. 4 is a view illustrating the RF tag paper detection unit, illustrated in FIG. 1, in more detail.

FIG. 4 is a view illustrating the RF tag paper detection unit illustrated in FIG. 1 in more detail.

As illustrated in FIG. 4, the RF tag paper detection unit 150 includes an oscillation part 410, a transmission part 420, a detection part 430, an amplification part 440, a signal shaping part 450, a power supply part 460, a display part 470, a signal output part 480 and a control part 490.

An oscillator of the oscillation part 410 may use various frequencies, but in this embodiment, an 8.2 MHz 10 PPM crystal oscillator is used to provide the control part 490 and the transmission part 420 with an oscillation frequency that oscillates at a preset 8.2 MHz.

The transmission part 420 is activated when the 8.2 MHz oscillation frequency is provided from the oscillation part 410, and then transmits an 8.2 MHz transmission signal to the RF tag of security paper. The transmission part 420 includes an RF transmission antenna. Here, it is desirable to arrange the RF transmission antenna across the width direction of the paper in order to detect the RF tag by supplying power thereto, regardless of the location of the RF tag in the paper.

The detection part 430 separates an RF signal from signals input from multiple antennas, which include not only an RF reception antenna but also an RF transmission antenna. The level of the antenna signal detected by the detection part 430 may vary depending on the speed of the signal from the RF tag inserted in the security paper and the intensity of the response signal based on the distance between the detection part 430 and the RF tag. Therefore, it is desirable for the transmission part 420 to include a switching function for controlling the intensity of output power of the RF transmission antenna and the range of detection of the RF tag, i.e. the sensitivity.

In other words, if the intensity of output power of the RF transmission antenna in the transmission part 420 is excessively strong, the detection part 430 may even detect the RF tag paper stacked in the paper stack unit 110, thus causing incorrect operation. Therefore, in order to avoid detection of the RF to paper stacked in the paper stack unit 110, the intensity of the output power of the RF transmission antenna may be regulated. Also, while the RF paper is moving, the sensitivity of detection of the RF tag may be adjusted so as to fall within the range of 10 to 30% using a switch function.

The amplification part 440 amplifies the detected small signal output from the detection part 430. The transmission part 420, the detection part 430, and the amplification part 440 are components that greatly affect the detectable distance of the RF tag inserted in the security paper, and desirably, the sensitivity and output thereof may be set so as to enable an RF tag at least 20 mm to 50 mm distant therefrom to be detected.

The signal shaping part converts the amplified RF signal, provided from the amplification part 440, into a digital signal to be provided to the control part 490. The power supply part 460 generates power to be supplied to each of the parts, and may be supplied with direct voltage of 7V to 9V as input power in order to supply output voltage of 5V.

The display part 470 serves to represent whether an RF tag has been detected in the security paper, and may use multiple LEDs having different colors. The signal output part 480 serves to transmit a security paper feeding detection signal to the main body of the image-forming apparatus. The signal output part 480 may output a high signal in a standby state or when an RF tag is detected from security paper, but may output a low signal when common paper is detected.

Figure 5:
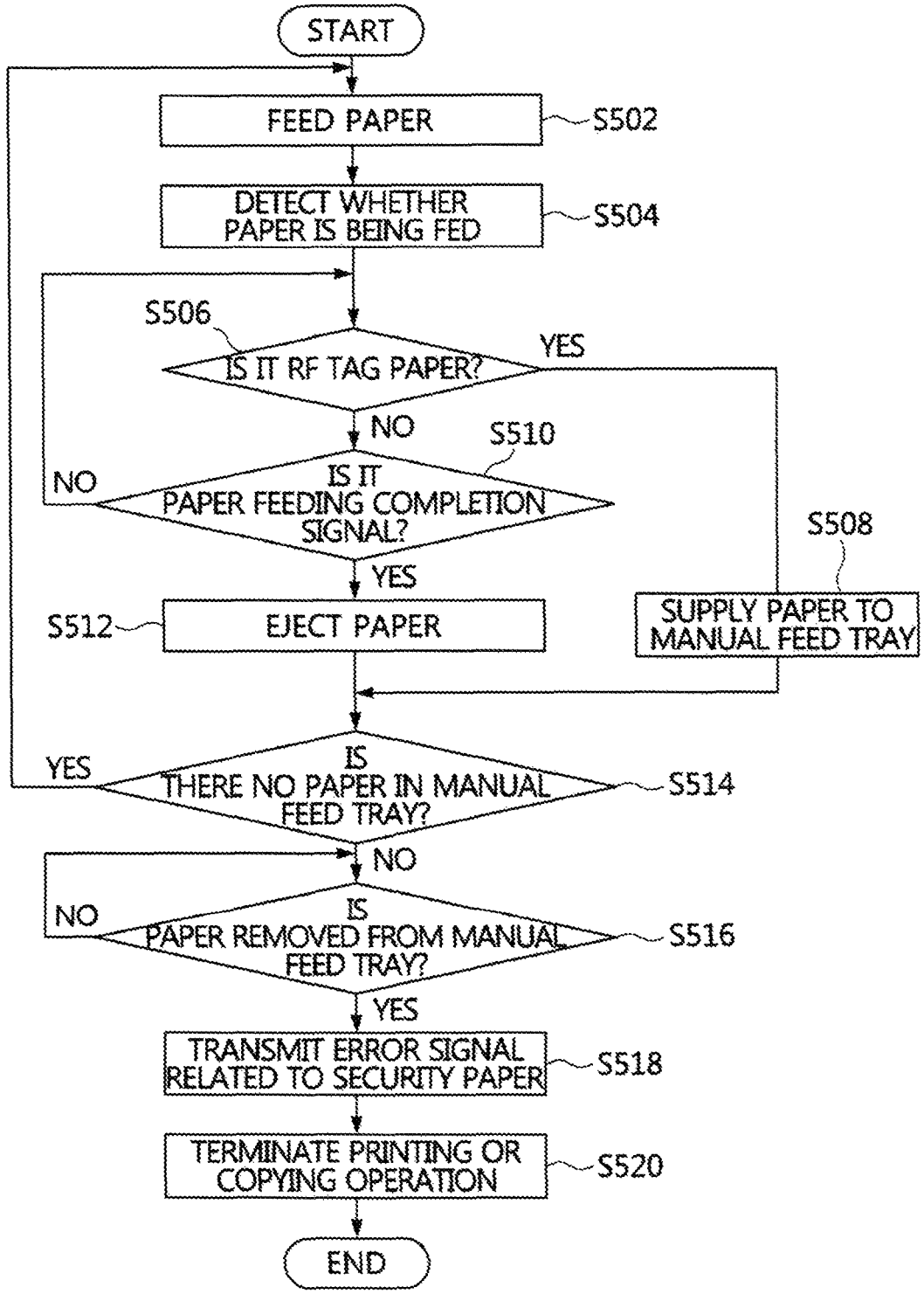
FIG. 5 is a flowchart of an image-forming method according to another embodiment of the present invention.

FIG. 5 is a view illustrating a flowchart of an image-forming method according to another embodiment of the present invention.

At step S502, the unit controller 190 operates the paper feed unit 120 so as to feed paper from the paper stack unit 110 in order to supply security paper to the RF tag paper detection unit 150. At step S504, the paper movement detection unit 130 detects whether paper is being fed when the paper feed unit 120 is operated by the unit controller 190.

Then, if a paper feeding detection signal is input from the paper movement detection unit 130, the unit controller 190 controls the RF tag paper detection unit 150 in order for the RF transmission antenna of the RF tag paper detection unit 150 to supply power to the RF tag of the security paper, and checks whether an RF tag detection signal is input from the RF tag paper detection unit 150 at step S506.

If an RF tag detection signal is input from the RF tag paper detection unit 150, the unit controller 190 determines that security paper is inserted and controls the paper movement division unit 160 so as to supply the paper to the manual feed tray at step S508.

However, if a paper feeding completion signal is input from the paper movement detection unit 130 at step S510 as a result of completion of feeding of the paper but an RF tag detection signal is not input from the RF tag paper detection unit 150, the unit controller 190 controls the paper movement division unit 160 so as to eject paper at step S512 in order to prevent the common paper from being supplied to the manual feed tray.

If the main body of the image-forming apparatus takes in the security paper from the manual feed tray and there is no security paper in the manual feed tray, the manual feed fray paper detection unit 170 provides a security paper absence signal to the unit controller 190 at step S514. If there is no security paper in the manual feed tray, the unit controller 190 controls the paper feed unit 120 so as to supply RF tag paper to the manual feed tray again at step S502.

Meanwhile, if a user removes RF tag paper from the manual feed tray in order to load common paper into the manual feed tray, the manual feed tray paper detection unit 170 detects this and provides a paper removal signal to the unit controller 190 at step S516. The unit controller 190 transmits a security paper-related error signal to the main body of the image-forming apparatus through the device interface unit 180 at step S518. Accordingly, the main body of the image-forming apparatus terminates a copying or printing operation at step S520.

As described above, the present invention forms an image only on security paper, whereby documents may be prevented from being leaked.

Also, the present invention may reduce development costs and purchase costs by arranging a security paper detection unit outside a main body and by supplying security paper to a manual feed tray.

Also the present invention, may regulate power, which is output from an RF transmission antenna, whereby erroneous operation caused by detecting sheets of RF tag paper stacked in a paper stack unit may be prevented.

As described above, embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An external security paper detection unit, comprising:
a paper stack unit in which sheets of paper are stacked;
a paper feed unit for feeding the paper stacked in the paper stack unit;
a security paper detection unit for detecting whether moving paper is security paper;
a unit controller for normally supplying the moving security paper to a manual feed tray if the paper feed unit operates and a security paper detection signal is input from the security paper detection unit;
a paper movement detection unit for detecting whether paper is being fed; and
a paper movement division unit for supplying security paper to the manual feed tray if the moving paper is security paper and for ejecting the moving paper if the moving paper is not security paper, wherein the unit controller is configured to:
control the security paper detection unit so as to be activated if a paper detection signal is input from the paper movement detection unit;
control the paper movement division unit so as to supply the moving paper to the manual feed tray if a security paper detection signal is input from the security paper detection unit; and
generate a warning alarm and simultaneously control the paper movement division unit so as to eject the moving paper if a paper feeding completion signal is input from the paper movement detection unit but the security paper detection signal is not input from the security paper detection unit.

2. The external security paper detection unit of claim 1, further comprising a manual feed tray paper detection unit for detecting whether security paper is present in the manual feed tray,
wherein the unit controller controls the paper feed unit so as to feed the paper stacked in the paper stack unit if a paper absence signal is input from the manual feed tray paper detection unit.

3. The external security paper detection unit of claim 1, wherein:
the security paper is paper in which an RF tag is inserted, and
the security paper detection unit is an RF tag paper detection unit that detects the RF tag inserted in the security paper.

4. The external security paper detection unit of claim 3, wherein the RF tag paper detection, unit comprises:
a transmission part for supplying power to the RF tag through an RF transmission antenna;
a reception part for receiving a tag signal from the RF tag through an RF reception antenna;
a signal shaping part for converting the tag signal received by the reception part into a digital signal; and
a control part for determining whether moving paper is RF tag paper based on the digital signal input from the signal shaping part.

5. The external security paper detection unit of claim 4, wherein the reception part receives the tag signal from the RF tag not only through the RF reception antenna but also through the RF transmission antenna.

6. The external security paper detection unit of claim 5, wherein:
the transmission part includes multiple switching functions that adjust an intensity of, output power of the RF transmission antenna, and
the control part controls the multiple switching functions of the transmission part based on a level of the tag signal from the RF tag, which is received by the reception unit.

7. An image-forming apparatus, comprising:
the external security paper detection unit according to claim 1; and
a main body that stops taking in paper loaded in the manual feed tray if an error signal related to security paper is input from the external security paper detection unit.

8. An external security paper detection unit, comprising:
a paper stack unit in which sheets of paper are stacked;
a paper feed unit for feeding the paper stacked in the paper stack unit;
a security paper detection unit for detecting whether moving paper is security paper;

a unit controller for normally supplying the moving security paper to a manual feed tray if the paper feed unit operates and a security paper detection signal is input from the security paper detection unit;

a paper movement detection unit for detecting whether paper is being fed; and a device interface unit that communicates with a main body of an image-forming apparatus, wherein the unit, controller is configured to:

control the security paper detection unit so as to be activated if a paper detection signal is input from the paper movement detection unit;

supply the moving paper to the manual feed tray regardless of whether a security paper detection signal is input from the security paper detection unit; and control the device interface unit so as to transmit a security paper error signal to the main body of the image-forming apparatus if a paper feeding completion, signal is input from the paper movement detection unit but the security paper detection signal is not input from the security paper detection unit.

9. An image-forming method, comprising:

feeding paper from a paper stack unit;

detecting whether moving paper is security paper;

normally supplying the moving security paper to a manual feed tray if a security paper detection signal is input as a result of the detecting;

detecting whether paper is moving due to the feeding;

activating the detecting whether the moving paper is security paper if movement of the paper is detected as a result of the detecting whether the paper is moving; and categorizing paper so as to supply the moving paper to the manual feed tray if a security paper detection signal is input in the detecting whether the moving paper is security paper, and so as to generate an alarm and simultaneously eject the moving paper if a paper feeding completion signal is input but the security paper detection signal is not input in the detecting whether the moving paper is security paper.

10. The image-forming method of claim 9, further comprising, supplying the moving paper to the manual feed tray regardless of whether the security paper detection signal is input in the detecting whether the moving paper is security paper, and transmitting a security paper error signal to a main body of an image-forming apparatus if a paper feeding completion signal is input but the security paper detection signal is not input in the detecting whether the moving paper is security paper.

11. The image-forming method of claim 9, further comprising, returning to the feeding in order to, supply the paper stacked in the paper stack unit if there is no paper as a result of detection of whether security paper is present in the manual feed tray.

12. The image-forming method of claim 9, wherein:

the security paper is security paper in which an RF tag is inserted, and the detecting whether the moving paper is security paper is configured to detect the RF tag inserted in the security paper.

13. The image-forming method of claim 12, further comprising, taking in, by a main body of an image-forming apparatus, the paper supplied to the manual feed tray if there is no error signal related to the security paper, and stopping, by the main body of the image-forming apparatus, the taking in the paper supplied to the manual feed tray if the error signal related to the security paper is input.

* * * * *